(12) United States Patent
Pennello

(10) Patent No.: US 7,162,713 B2
(45) Date of Patent: Jan. 9, 2007

(54) DIFFERENCE ENGINE METHOD AND APPARATUS

(75) Inventor: Thomas J. Pennello, Santa Cruz, CA (US)

(73) Assignee: ARC International, Elstree (GB)

( * ) Notice: Subject to any disclaimer, the term of this patent is extended or adjusted under 35 U.S.C. 154(b) by 683 days.

(21) Appl. No.: 09/805,423

(22) Filed: Mar. 13, 2001

(65) Prior Publication Data

US 2001/0056571 A1 Dec. 27, 2001

Related U.S. Application Data

(60) Provisional application No. 60/189,192, filed on Mar. 14, 2000.

(51) Int. Cl.
G06F 9/44 (2006.01)

(52) U.S. Cl. ............ 717/124; 717/135; 717/131

(58) Field of Classification Search .......... 717/124–135, 717/141–143, 136–140; 716/4, 5; 703/14, 703/20, 22, 28; 340/146.2
See application file for complete search history.

(56) References Cited

U.S. PATENT DOCUMENTS

| | | | |
|---|---|---|---|
| 4,285,035 A | | 8/1981 | Kindell et al. |
| 4,845,610 A | * | 7/1989 | Parvin ..................... 712/17 |
| 4,899,128 A | * | 2/1990 | Shapiro ............... 340/146.2 |
| 5,060,147 A | | 10/1991 | Mattheyses |
| 5,307,424 A | | 4/1994 | Kuehl et al. |
| 5,369,760 A | | 11/1994 | Iijima |
| 5,379,036 A | | 1/1995 | Storer |
| 5,465,374 A | | 11/1995 | Dinkjian et al. |
| 5,511,159 A | | 4/1996 | Baker et al. |
| 5,584,011 A | | 12/1996 | Kawase et al. |
| 5,604,495 A | | 2/1997 | Watanabe |
| 5,604,899 A | | 2/1997 | Koktor |
| 5,608,887 A | | 3/1997 | Dinkjian et al. |
| 5,627,748 A | | 5/1997 | Baker et al. |
| 5,640,551 A | | 6/1997 | Chu |
| 5,673,387 A | * | 9/1997 | Chen et al. ................ 714/38 |
| 5,675,711 A | | 10/1997 | Kephart et al. |
| 5,787,443 A | | 7/1998 | Palmer |
| 5,832,520 A | | 11/1998 | Miller |
| 5,848,264 A | * | 12/1998 | Baird et al. ................ 703/28 |
| 5,864,858 A | | 1/1999 | Matsumoto et al. |
| 6,295,524 B1 | * | 9/2001 | Yianilos et al. ........... 706/12 |
| 6,496,792 B1 | * | 12/2002 | Magnusson ............... 703/27 |
| 6,606,735 B1 | * | 8/2003 | Richardson et al. ......... 716/5 |

FOREIGN PATENT DOCUMENTS

EP 04149747 5/1992

(Continued)

OTHER PUBLICATIONS

Kernighan et al., "The Practice of Programming"; Addison-Wesley; Lucent Technologies, 1999; pp. 149-151.*

(Continued)

Primary Examiner—Kakali Chaki
Assistant Examiner—William H. Wood
(74) Attorney, Agent, or Firm—Gazdzinski & Associates

(57) ABSTRACT

A method and apparatus for analyzing and formatting strings of data, such as data derived from software processes running on two data processors. In one embodiment, a plurality of different data strings are initialized building a symbol array, and finding differences within the data by analyzing various relationships within the data strings, such as the existence of unique strings. A computer program and apparatus for synthesizing logic implementing the aforementioned methodology are also disclosed.

25 Claims, 14 Drawing Sheets

FOREIGN PATENT DOCUMENTS

WO      WO 92/14202      8/1992

OTHER PUBLICATIONS

Aho et al., "Compilers Principles, Techniques, and Tools"; Addison-Wesley; Bell Telephone Labotatories, Inc., 1986; pp. 429-440.*

Douglis, Fred, et al., (Apr. 14, 1997), "The AT&T Internet Difference Engine: Tracking and Viewing Changes on the Web," AT&T Labs, Research Technical Report #97.23.1—XP002135690.

* cited by examiner

DIFFERENCE ENGINE METHOD AND APPARATUS

This application claims priority to U.S. Provisional Patent Application Ser. No. 60/189,192 filed Mar. 14, 2000, entitled "Difference Engine Method And Apparatus", the disclosure of which is incorporated herein in its entirety.

COPYRIGHT

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of the Invention

The present invention relates to the field of methods of manipulating data, and specifically to computer programs useful for the manipulation and analysis of data strings associated with one or more digital processors or peripheral devices, such as during processor debug analysis.

2. Description of Related Technology

RISC (or reduced instruction set computer) processors are well known in the computing arts. RISC processors generally have the fundamental characteristic of utilizing a substantially reduced instruction set as compared to non-RISC (commonly known as "CISC") processors. Typically, RISC processor machine instructions are not all micro-coded, but rather may be executed immediately without decoding, thereby affording significant economies in terms of processing speed. This "streamlined" instruction handling capability furthermore allows greater simplicity in the design of the processor (as compared to non-RISC devices), thereby allowing smaller silicon and reduced cost of fabrication.

RISC processors are also typically characterized by (i) load/store memory architecture (i.e., only the load and store instructions have access to memory; other instructions operate via internal registers within the processor); (ii) unity of processor and compiler; and (iii) pipelining.

In addition to the single RISC processor core described above, such cores may be used in conjunction with the same or other types of processor cores, whether as physically discrete components or as functions within a single die. For example, a plurality of similar or identical microprocessor cores may be used to form a multi-processor architecture adapted for parallel processing of data streams. Alternatively, a microprocessor core may be used with a digital signal processor (DSP) core on the same die, the DSP core performing high sampling rate operations requiring its unique architecture (such as FFT calculations or speech processing).

In such multi-core environments (and in fact in other types of configurations), situations frequently arise wherein data may need to be converted from one format to another, or patterns within the data recognized and analyzed to identify useful functional relationships based thereon, or identify problems within the cores. For example, the comparison of the respective processor core stack traces for a debugging program has significant utility for such data manipulation and analysis. Similarly, the designer/programmer may wish to examine state information from the various cores during programming or design synthesis.

One example of the foregoing problem is graphically illustrated in Table 1 below:

TABLE 1

| Input 1 | Input 2 | Input 3 | Input 4 |
|---------|---------|---------|---------|
| A | A | A | S |
| R | C | C | T |
| B | B | B | U |
| C | C |   | V |
| D | D | D |   |
| B | B | B |   |

Given the four input strings (i.e., Inputs 1–4) of Table 1, it might be desired to have the output formatted as follows:

[1–3] A
[1] R
[2,3] C
[1–3] B
[1,2] C
[1–3] D
[1–3] B
[4] S
[4] T
[4] U
[4] V

Heretofore, algorithms adapted to format or analyze data have not been adapted and optimized for formatting such data derived from a plurality of inputs (such as a plurality of processor cores), and analyzing and recognizing patterns therein, especially in the context of multiprocessor core debug. For example, prior art UNIX-based systems having routines adapted for differencing two files (e.g., "diff") are generally useful only for comparing two files, and are not optimized for formatting or recognizing patterns or differences within "N" data inputs or files.

When such formatting and analysis of the N inputs is optimized, the analysis/debug process is made more efficient as a whole, and more useful information can be readily extracted. Such is the case in debugging multiple parallel processor cores, such as the aforementioned RISC processors. Consider the example of a debugger, wherein the same program is run on two different processor cores simultaneously, and where the output of both programs is expected to be the same:

```
SC>go Try
[1] queens.c!26: void Try(Integer I, Boolean *Q) {
[1] Execution stopped at breakpoint.
[2] queens.c!26: void Try(Integer I, Boolean *Q) {
[2] Execution stopped at breakpoint.
SC>source
[1] >26 void Try(Integer I, Boolean *Q) {
[1] 27 Integer J=0;
[1] 28 do {
[1] 29 J++; *Q=False;
[2] >26 void Try(Integer I, Boolean *Q) {
[2] 27 Integer J=0;
[2] 28 do {
[2] 29 J++; *Q=False;
```

Note that the output of both processors (identified as "[1]" and "[2]" in the code above) must be visually inspected by the programmer to ensure that the two programs have arrived at the same function together.

Furthermore, in the case where such formatting or pattern recognition is required in a repetitive or iterative fashion, inefficiencies such as the foregoing visual inspection requirement may be multiplied many times over.

Based on the foregoing, there is a need for an improved method and apparatus for formatting such data from a plurality of outputs from one or more threads, and analyzing and recognizing patterns therein. Ideally, such method and apparatus would be adapted to format/analyze a plurality ("N") of different input sources, confirm the presence of similarities in the data associated with each source, and automatically identify the presence and location of differences therein. Such improved method would also be able to be reduced to an algorithmic or computer program representation for ready use in a variety of different hardware environments.

SUMMARY OF THE INVENTION

The present invention satisfies the aforementioned needs by providing an improved method and apparatus for analyzing data strings, particularly in the multi-processor environment.

In a first aspect of the invention, an improved method for analyzing data comprising one or more strings or threads is disclosed. The method generally comprises initializing the data by building a symbol array; and finding differences within the data by analyzing various relationships within the data strings, such as the existence of unique strings.

In one exemplary embodiment, the method of initializing comprises creating an empty symbol table; creating a symbol array with at least one element for each input string; for each input string, determining whether the string is in the symbol table; and if the string is in the symbol table, then obtaining the symbol number of the string from the symbol table.

In one exemplary embodiment, the method of finding differences within the data comprises providing a plurality of inputs; processing inputs which do not share any strings with other inputs (i.e., "unique" inputs); evaluating the excluded set; identifying groups of contiguous strings which are identical in all inputs (i.e., finding "shared chunks"); identifying groups that are in the same order in all of the inputs; identifying inputs with strings before the first group; and finding differences among the subset of inputs comprising such strings before the first group.

In one exemplary embodiment, the method of processing unique inputs comprises clearing the symbol counts array; for each string in each input, incrementing the symbol count; for each string in each input, determining the symbol count for that string; and for each input, adding the input to the excluded set.

In one exemplary embodiment, the method of finding "shared chunks" comprises creating a list of anchors containing strings that occur at a predetermined frequency; for each input of each anchor, generating a new group and associating each anchor string with that group; for each input of each anchor, associating each string which precedes the group and which is identical in all inputs with the new group; and for each input of each anchor, associating each string which follows the group and which is identical in all inputs with the new group.

In a second aspect of the invention, an improved computer program useful for analyzing and formatting data obtained from a plurality of sources and embodying the aforementioned method(s) is disclosed. In one exemplary embodiment, the computer program comprises an object code representation stored on the magnetic storage device of a microcomputer, and adapted to run on the central processing unit thereof. The computer program further comprises an interactive, menu-driven graphical user interface (GUI), thereby facilitating ease of use.

In a third aspect of the invention, an improved apparatus for running the aforementioned computer program used for analyzing data strings associated with the design and/or operation of processors is disclosed. In one exemplary embodiment, the system comprises a stand-alone microcomputer system having a display, central processing unit, data storage device(s), and input device. The system is adapted to take a plurality of data inputs from various external processor devices and format and analyze the inputs in order to confirm similarities and identify differences therein, and display the results of such analysis to the user (programmer).

In a fourth aspect of the invention, an improved method of designing a processing device adapted to run at least one software process thereon is disclosed. The method generally comprises generating a design for the processing device; running at least a portion of the software process a first time; obtaining a first output from the running process; modifying the design; running the software process a second time; obtaining a second output from the running process; and identifying differences within the first and second outputs.

In a fifth aspect of the invention, an improved method of evaluating the operation of a plurality of software processes running on respective ones of a plurality of digital processors is disclosed. The method generally comprises generating a first data string using a first of the plurality of software processes; generating a second data string using a second of the plurality of software processes; inputting the first and second data strings into a debug software process; analyzing the first and second data strings using the debug process; and evaluating the operation of the processes based at least in part on the act of analyzing. In one exemplary embodiment, the debug process is run on a microcomputer, and is adapted to confirm matching portions of the applications running on the digital processors, and identifying differing portions to alter the programmer to possible bugs in the design(s).

DETAILED DESCRIPTION

Reference is now made to the drawings wherein like numerals refer to like parts throughout.

As used herein, the term "processor" is meant to include any integrated circuit or other electronic device capable of performing an operation on at least one instruction word including, without limitation, reduced instruction set core (RISC) processors such as the ARC™ user-configurable core manufactured by the Assignee hereof, central processing units (CPUs), and digital signal processors (DSPs). The hardware of such devices may be integrated onto a single piece of silicon ("die"), or distributed among two or more dies. Furthermore, various functional aspects of the processor may be implemented solely as software or firmware associated with the processor.

As used herein the term "string" refers to the fundamental unit of input for purposes of comparison; e.g., a sequence of ASCII characters of arbitrary or fixed length.

As used herein the term "group" refers to a contiguous sequence of strings containing at least one anchor and for which the entire sequence has been determined to exist in all inputs currently under consideration.

As used herein the term "chunk" refers to a contiguous sequence of strings.

Description of Method

Figure 1:
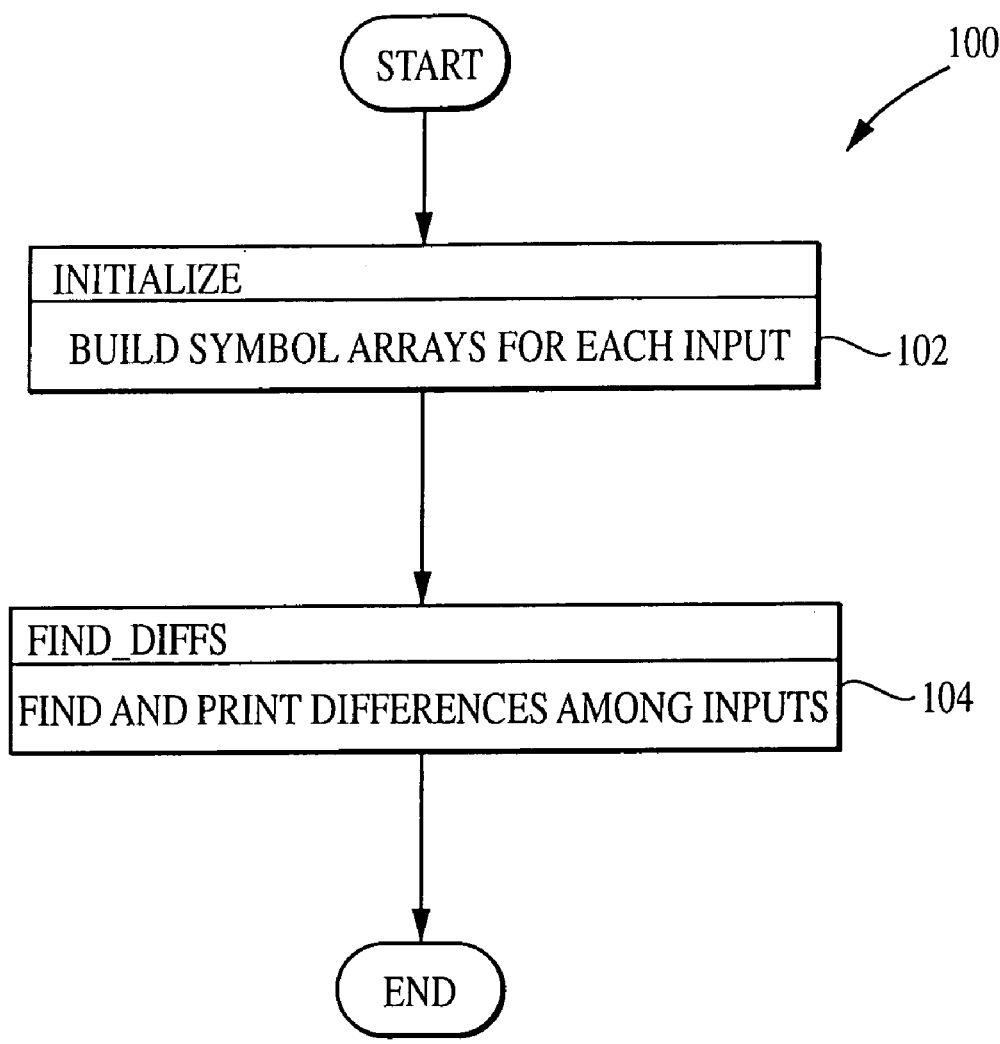
FIG. 1 is a logical flow diagram illustrating the general methodology of analyzing data having strings or threads employed in the difference engine of the present invention.

Referring now to FIG. 1, the method of analyzing and formatting data obtained from a plurality of data sources according to the present invention is described. While the following discussion is cast in terms of the logical flow of a computer program adapted to perform the method of the invention when run on a microcomputer system such as that of FIG. 9, it will be appreciated that the methods described herein may be embodied in other forms including, for example, hardware (e.g., logic circuits disposed within an integrated circuit such as an FPGA or ASIC) specifically adapted to provide the desired functionality.

As illustrated in FIG. 1, the method 100 generally comprises the steps of initializing the data obtained from the data sources (step 102), and finding (and printing, as applicable) the differences between the various inputs (step 104).

Figure 2:
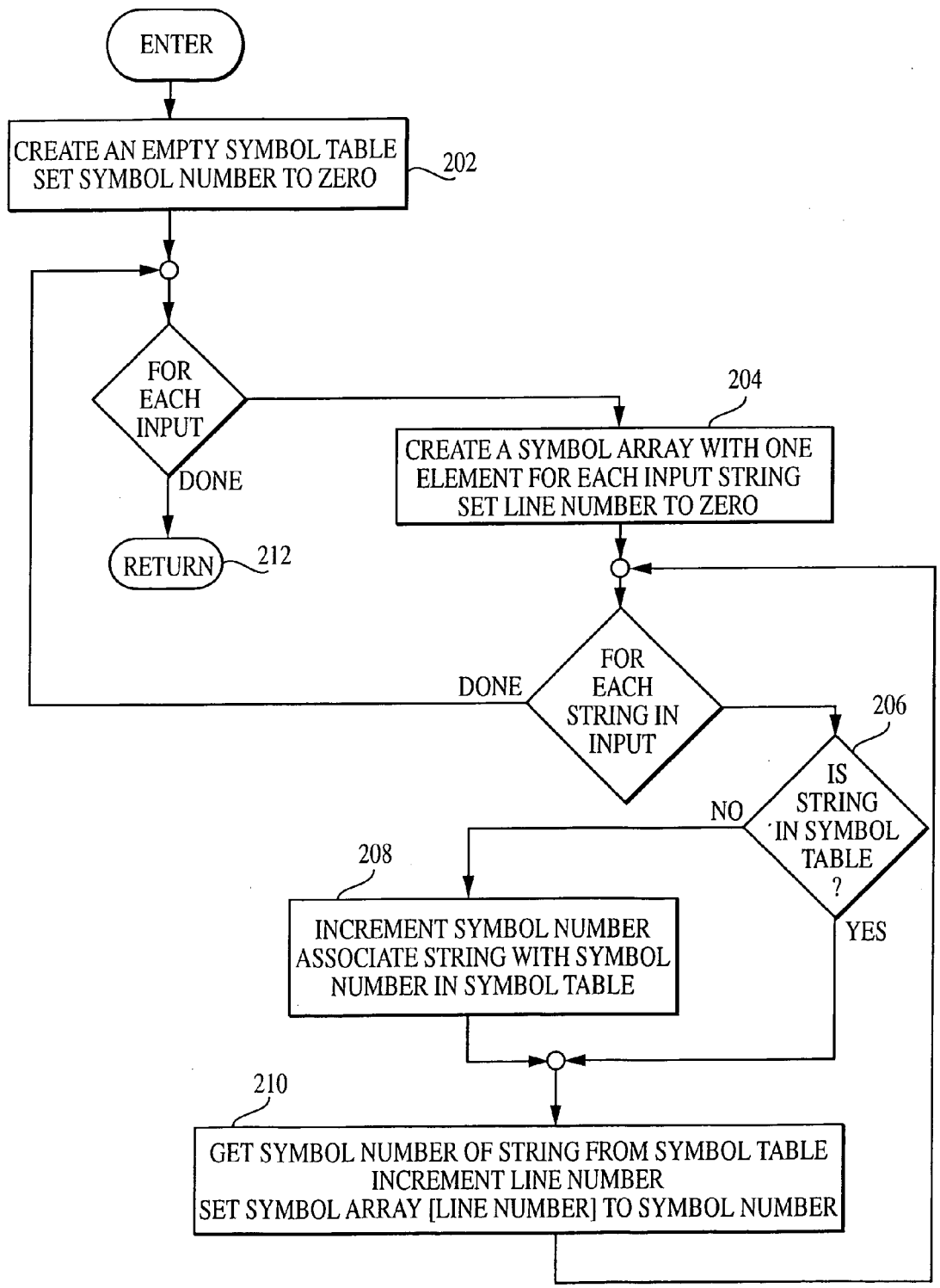
FIG. 2 is a logical flow diagram illustrating one exemplary embodiment of the method of initializing the difference engine of the present invention.

FIG. 2 describes the initialization step 102 in greater detail. As shown in FIG. 2, the process of initialization 102 comprises first creating an empty symbol table and setting the symbol number to zero per step 202. As used herein, the term "symbol number" refers to that number assigned to a corresponding distinct input. Next, in step 204, a symbol array with one element for each input string is created for each input, and the string number is set to zero. In step 206, the presence of the string in the symbol table is determined for each string of each input. If a string is not in the symbol table per step 206, the symbol number is incremented, and the string is associated with a symbol number in the symbol table per step 208. In step 210, the symbol number associated with the string (however obtained) is obtained from the symbol table, the line number is incremented, and the symbol array (line number) is set to the value of that symbol number. This process is repeated iteratively for each string in each input, using the foregoing steps, until all inputs have been analyzed, and the method 200 returns per step 212.

Figure 3:
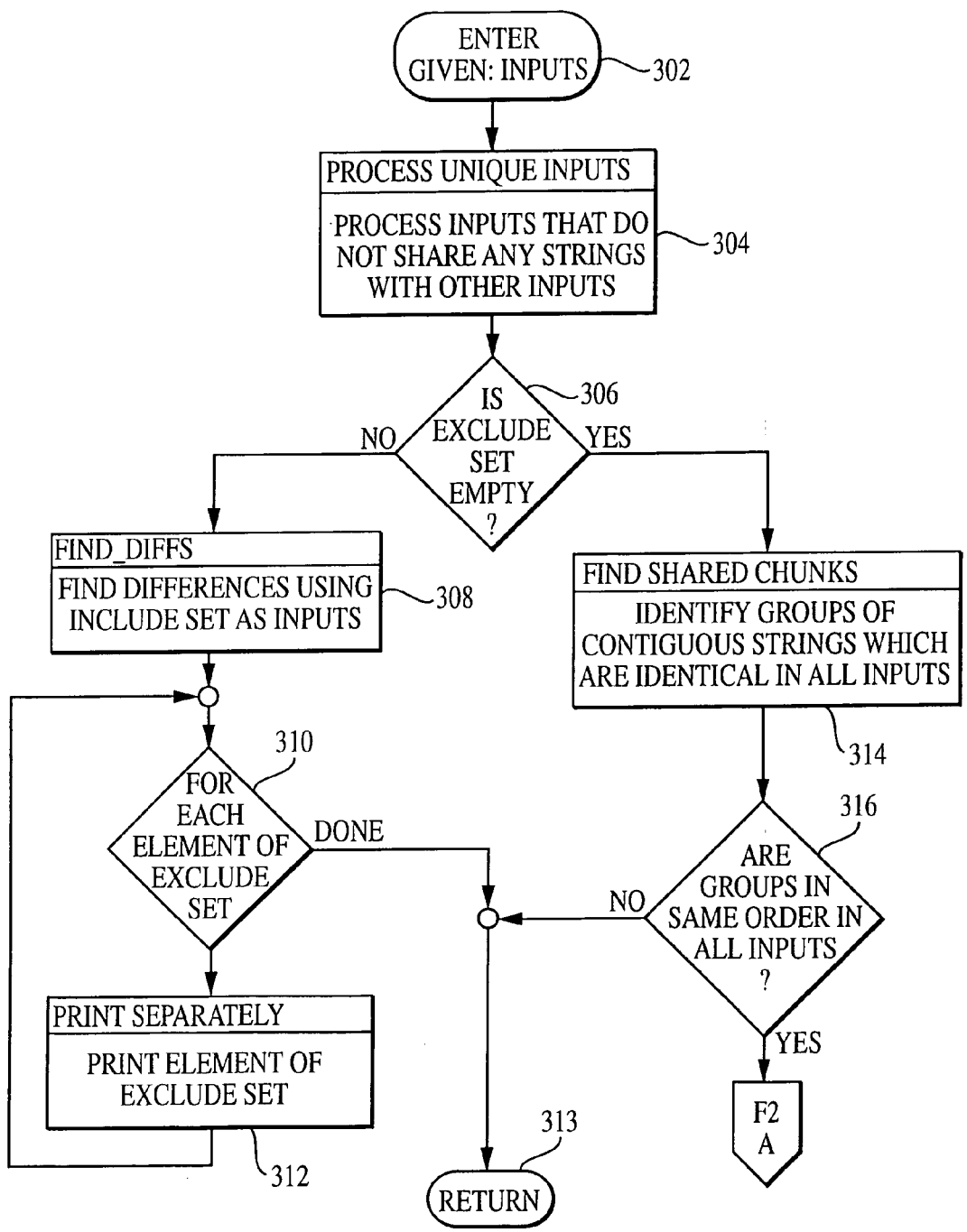
FIG. 3 is a logical flow diagram illustrating one exemplary embodiment of the method of finding differences in the input data strings used in the difference engine of the present invention.
Figure 3:
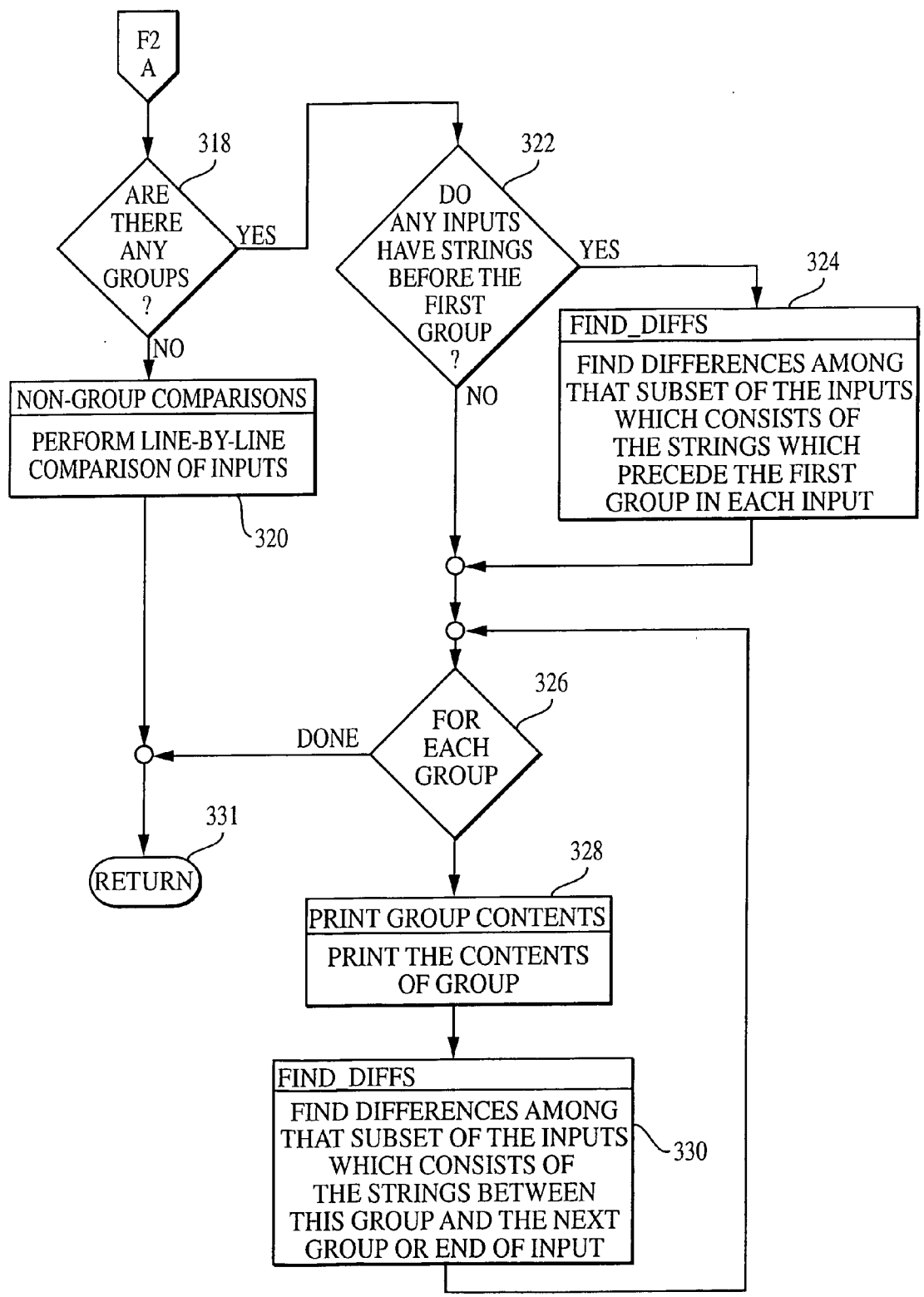

Referring now to FIG. 3, one embodiment of the method 300 of finding differences according to step 104 of FIG. 1 is described. First, the inputs are provided in step 302. Next, in step 304, inputs that do not share any strings with other inputs are processed. These inputs are termed "unique." FIG. 4 (described below) illustrates one embodiment of the method of processing the input data according to the invention, although other approaches may be substituted dependent on the needs of the particular application.

In step 306, the excluded set is examined to determine if it is empty. If not empty, the differences are identified using the "included" set as inputs per step 308. As used herein, the term "included" and "excluded" refer to data or elements which meet a predetermined criterion (and are hence "included" in a set of elements also meeting that criteria), or do not meet the predetermined criteria (and are hence "excluded"). In the present example, the criterion is whether the input stream has any members that match with other input streams, although it will be recognized that other criteria may be specified in place of or in addition to the aforementioned criterion. For each element of the excluded set (step 310), the element is printed per step 312. When this process is completed, the program returns per step 313.

If the excluded set is empty per step 306, groups of contiguous strings which are identical in all inputs are identified per step 314. These are referred to as "shared chunks;" shared chunks are described further with respect to FIG. 8 below. In step 316, the order of the groups or "shared chunks" is examined to determine if the groups are present in the same order in all inputs. If not, the method 300 returns per step 313. If so, the method 300 continues with step 318 of FIG. 3.

In step 318, it is determined whether any groups exist. If not, a line-by-line comparison of inputs is performed per step 320; non-group comparison is described further with respect to FIG. 5 herein. The method 300 then returns per step 331.

If groups do exist per step 318, it is next determined if any of the inputs have strings before the first group (step 322); if so, then the differences among that subset of the inputs which consists of the strings which precede the first group in each input is found per step 324. For each group (step 326), the contents of the group are then printed per step 328. In step 330, the differences among that subset of the inputs which consists of the strings between the present group and the next group (or end of input) are determined. After these steps 328, 330 have been performed for each group, the method 300 returns per step 331.

Figure 4:
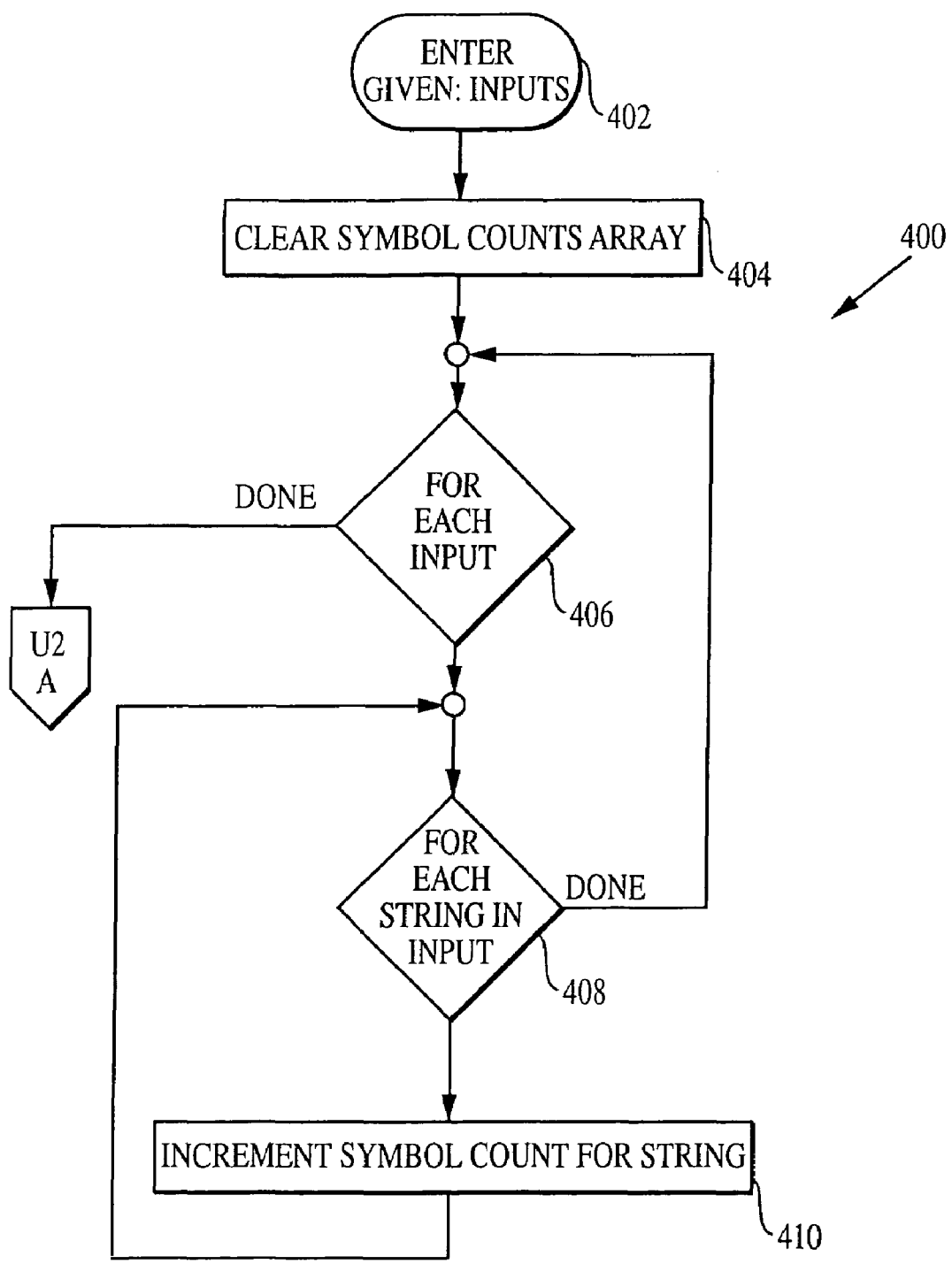
FIG. 4 is a logical flow diagram illustrating one exemplary embodiment of the method processing unique inputs employed in the difference engine of the present invention.
Figure 4:
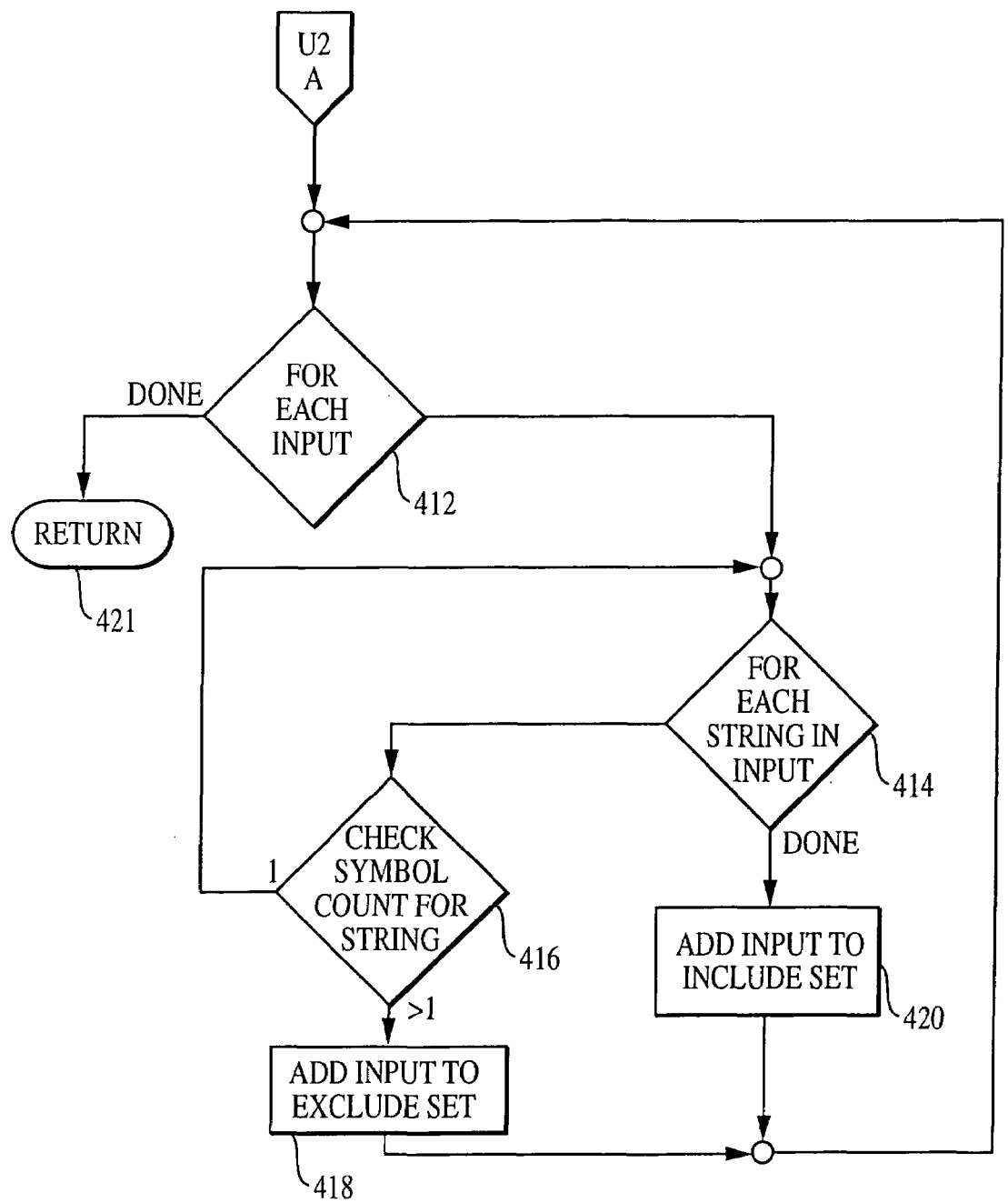

Referring now to FIG. 4, one embodiment of the method of processing unique inputs is described. The method 400 is entered with the aforementioned inputs in step 402. Next, the symbol counts array is cleared in step 404. For each string (step 408) in each input (step 406), the symbol count is incremented per step 410. When completed for all strings of all inputs, the method 400 proceeds to step 412 of FIG. 4.

For each string (step 414) in each input (step 412), the symbol count is checked per step 416. If the count is greater than a predetermined number (1 in the present embodiment), the input is added to the excluded set per step 418. Each input is then added to the included set in step 420, until all inputs are added and the method return per step 421.

Figure 5:
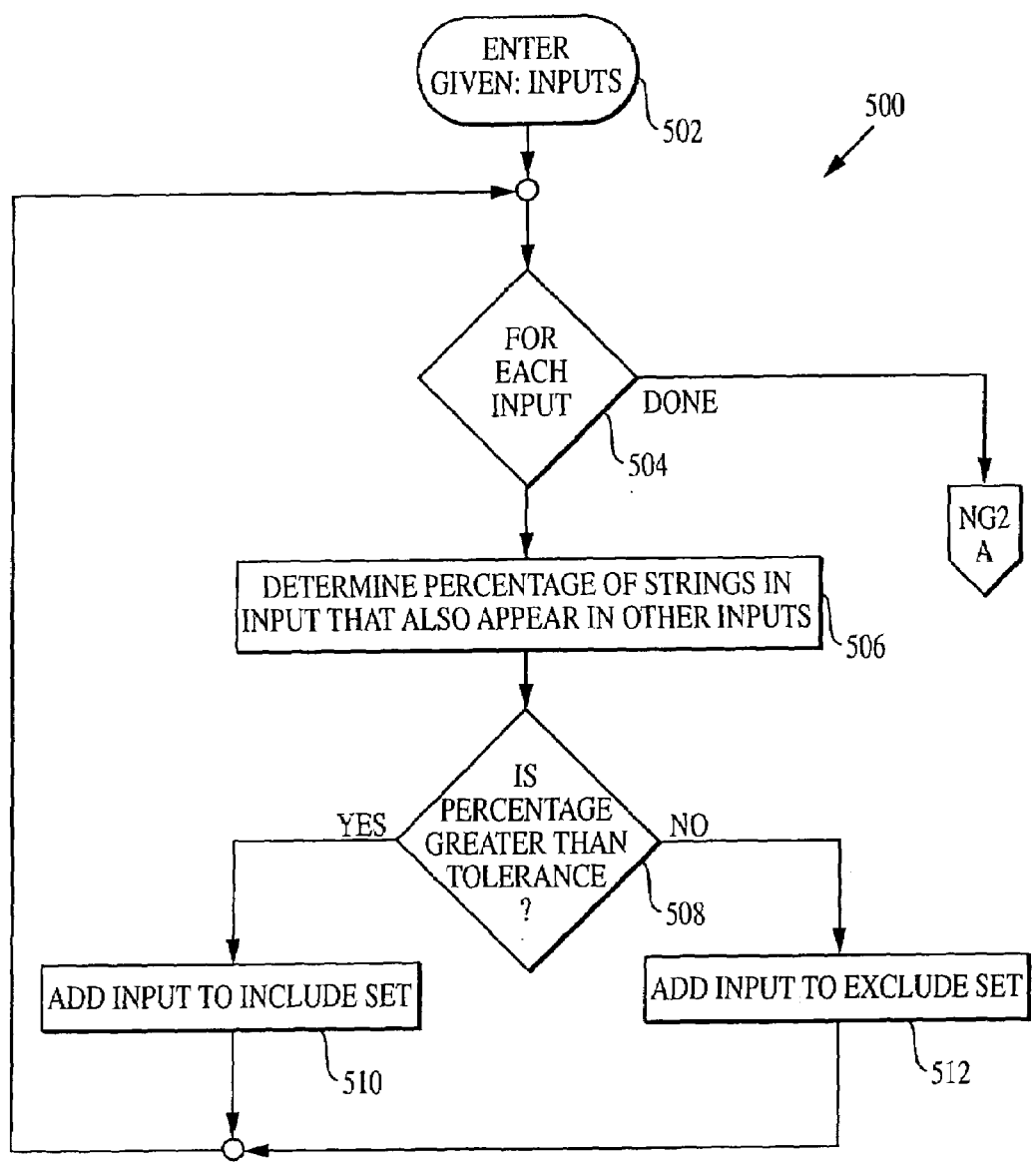
FIG. 5 is a logical flow diagram illustrating one exemplary embodiment of the method of non-group comparison employed in the difference engine of the present invention.
Figure 5:
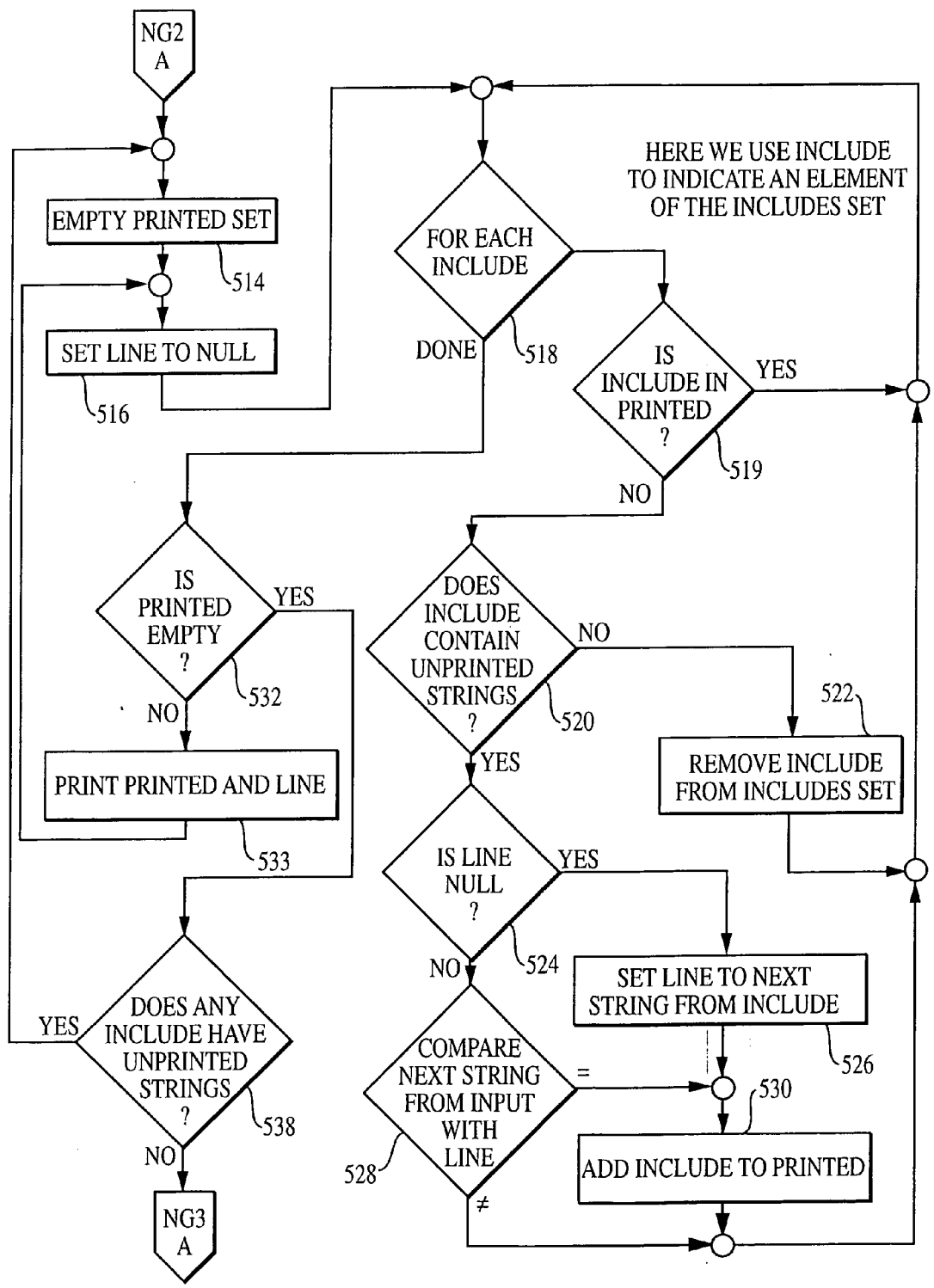
Figure 5:
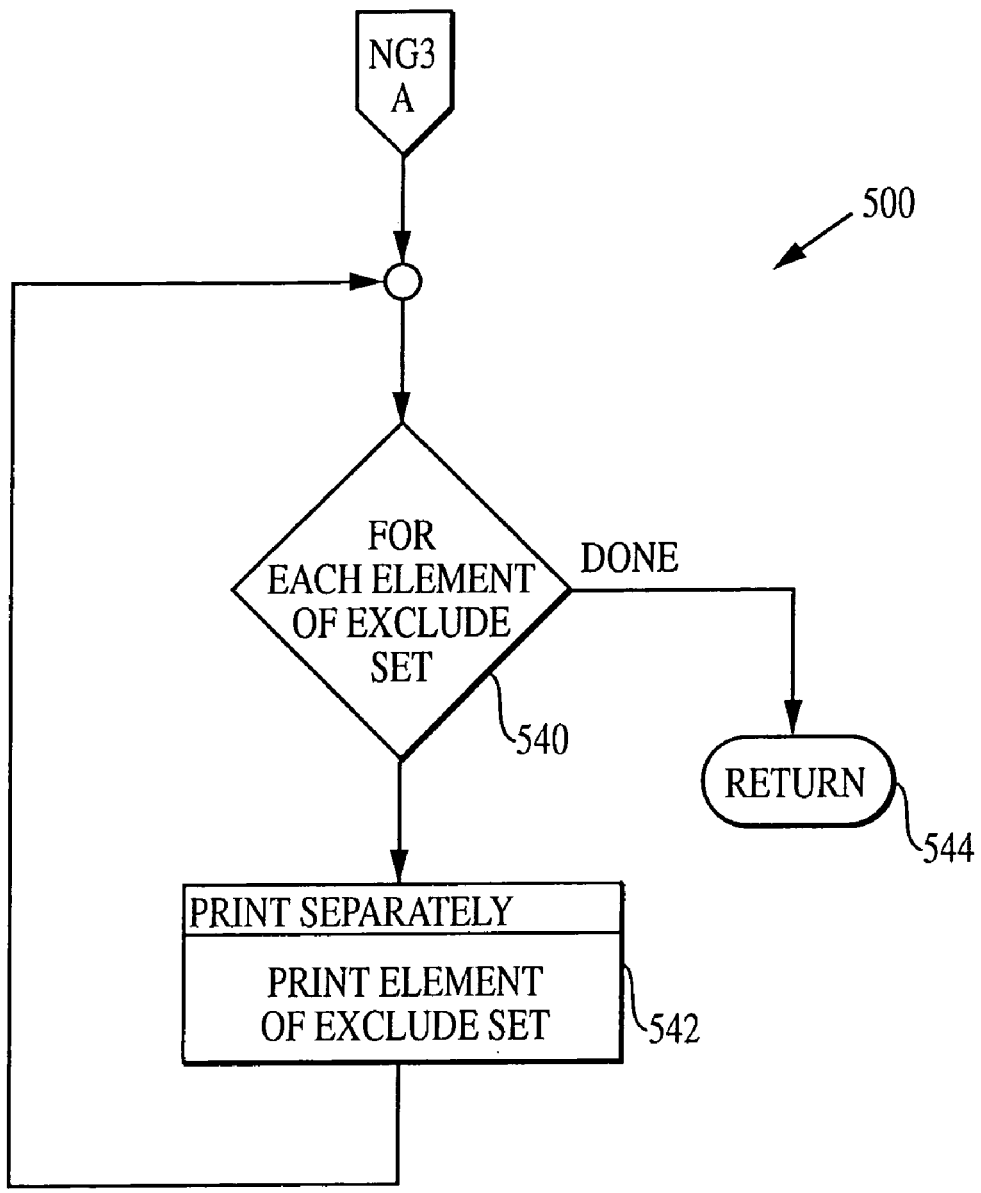

Referring now to FIG. 5, one embodiment of the method 500 of comparing non-groups according to the present invention is described. The method 500 is entered with the given inputs per step 502. For each input (step 504), the percentage of strings in the input that also appear in other inputs is determined in step 506. If the percentage is greater than a predetermined tolerance (step 508), the input is added to the included set in step 510. If not, the input is added to the excluded set per step 512. When completed, the method 500 proceeds to step 514 of FIG. 5.

As illustrated in FIG. 5, the printed set is first emptied per step 514. Next, the line is set to null per step 516. For each included element (step 518), it is determined whether the included element is in the printed set per step 519. If yes, the method returns to step 518. If not, the included element is examined to determine if it contains any unprinted strings per step 520. If not, the included element is removed from the included set per step 522. If so, it is next determined whether the line is null in step 524. The line is then set to the next string from the included set in step 526. If the line is not null, it is compared with the next string from the input per step 528. If it is equal, then the included element is added to the printed set per step 530. If the line is greater than or less than (i.e., not equal) the next string, the method returns to step 518 previously described. After the foregoing process is complete, the printed set is examined to determine whether it is empty per step 532. If the answer to the query of step 532 is "no", the printed set and line are printed per step 533, and the process is repeated by returning to step 516. If the answer is "yes", all included sets are then examined in step 538 to determine whether any have more strings. If not, the method continues to step 540 of FIG. 5, described below. If so, the method returns to step 514 for additional processing.

Referring again to FIG. 5, each element of the exclude set (step 540) is printed in step 542. The method 500 subsequently returns per step 544 upon completion.

Figure 6:
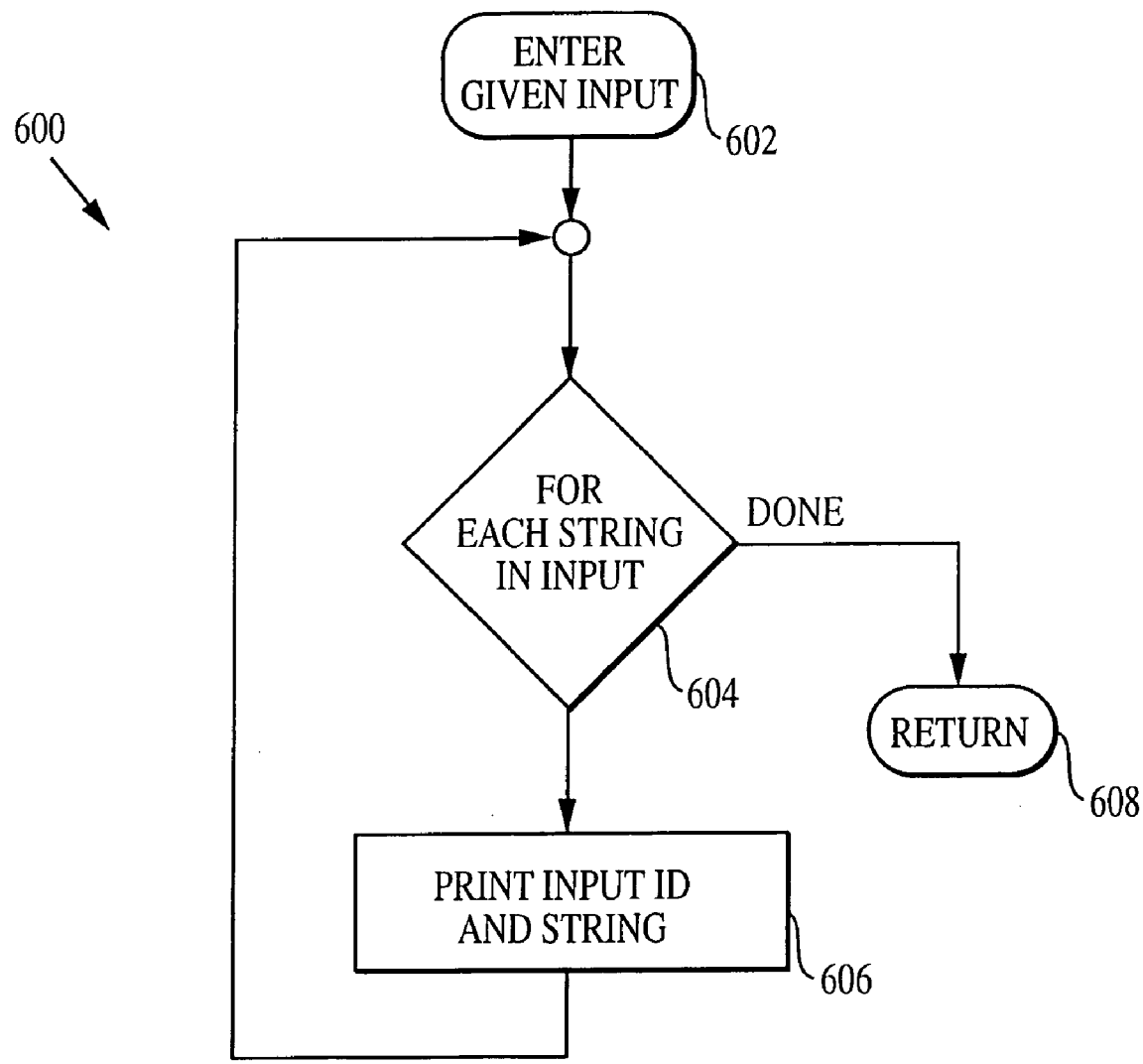
FIG. 6 is a logical flow diagram illustrating one exemplary embodiment of the methodology of separately printing strings according to the present invention.

Referring now to FIG. 6, one embodiment of the method 600 of separately printing one or more parameters associated with each input string according to the present invention is described. The method 600 is entered using the given input in step 602. It is noted that in the illustrated embodiment, the input of step 602 is a sub-sequence of one of the original input data streams with the identity of the original stream. For each string in the input (step 604), the input identification (ID) and string is printed per step 606. When the parameters for all strings in the input have been printed, the method returns per step 608.

Figure 7:
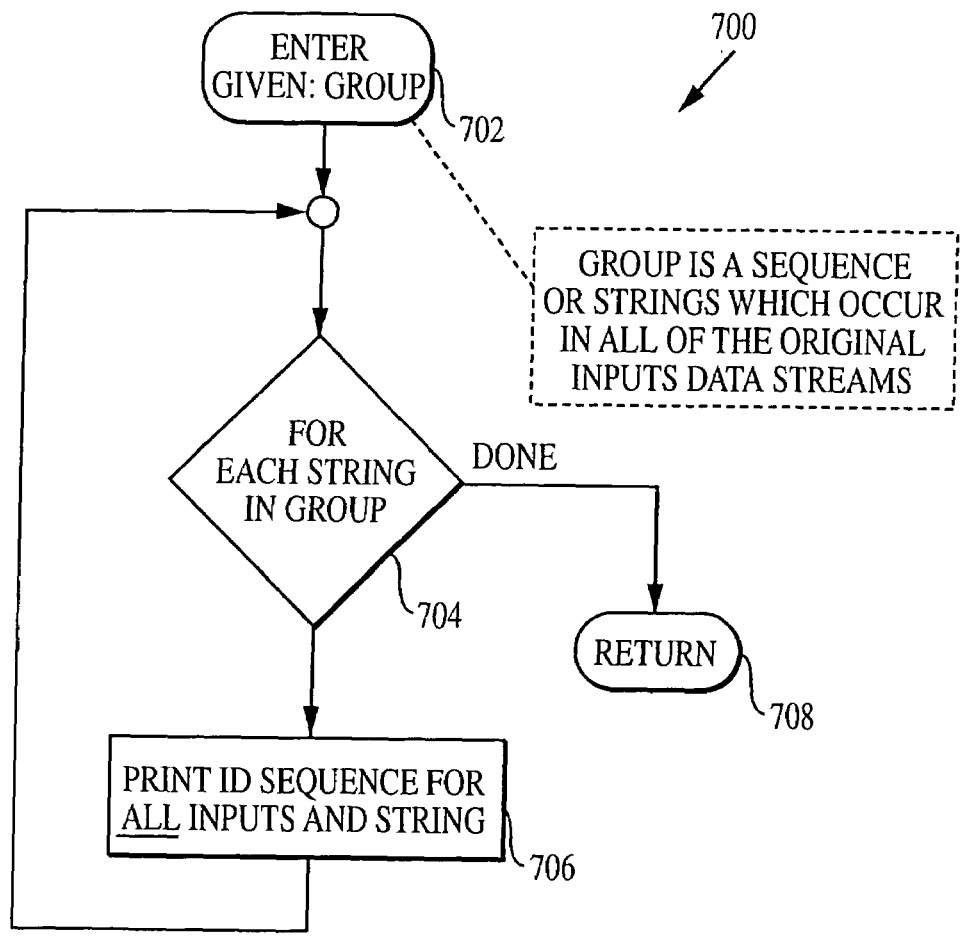
FIG. 7 is a logical flow diagram illustrating one exemplary embodiment of the methodology of printing group contents according to the present invention.

Referring now to FIG. 7, one embodiment of the method 700 of printing the contents of a group according to the present invention is described. The method 700 is entered using a given group in step 702. As used herein, a group refers to a sequence of strings which occur in all of the original input data streams. For each string in the given group (step 704), the ID sequence for all inputs and strings is printed per step 706 (i.e., the information identifying each of the inputs and the string currently under consideration is printed). After completion, the method 700 returns per step 708.

Figure 8:
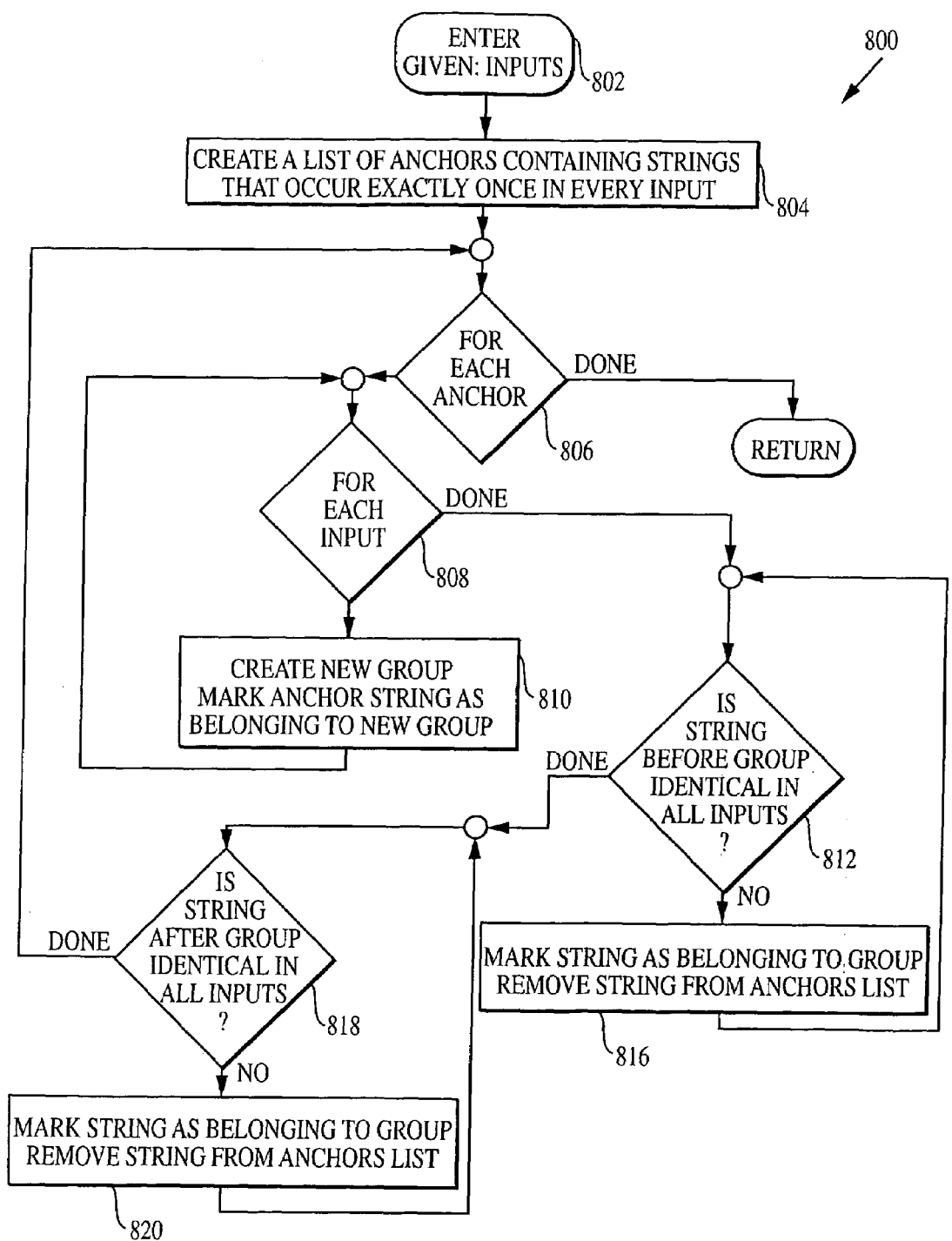
FIG. 8 is a logical flow diagram illustrating one exemplary embodiment of the methodology of finding shared chunks according to the present invention.

Referring now to FIG. 8, one embodiment of the method 800 of finding shared chunks according to the present invention is described. The method 800 is entered with the given inputs in step 802. Next, a list of anchors containing strings that occur exactly once in every input are created in step 804. As used herein, the term "anchor" refers to strings that occur exactly once in every input. For each input (step 808) of each anchor (step 806), a new group is created, the anchor string is marked as belonging to the new group per step 810. Next, in step 812, it is determined whether the string before the group (i.e., before the sequence of strings shared among all the inputs) is identical in each of the inputs.

In step 816, the string is marked or otherwise identified as belonging to that group, and the string is removed from list of anchors. When completed, the string immediately after the group is examined to determine if it is identical in each of the inputs per step 818. The string is marked as belonging to that group, and the string is removed from the list of anchors per step 820.

It is noted that the use of a symbol table and sequentially allocated symbol numbers in conjunction with the foregoing method is not required, but it does provide a significant performance improvement during the comparison phases. Specifically, such performance improvements may be obtained through the use of a symbol table with sequentially allocated symbol identifiers (IDs), as well as provisions for maintaining information about which inputs contain a given line and frequency of occurrence thereof. In one embodiment, the method of implementing the aforementioned symbol table comprises first scanning through each input to build the table, and then replacing each input line with its associated symbol. The various line comparisons are therefore reduced to simple comparisons of the symbol's ID. Other methods of producing a symbol table may also be substituted however.

Furthermore, it is noted that by counting how often each symbol occurs, and in which inputs, the need to actually scan through the individual inputs looking for matches may be reduced or even eliminated.

It will also be recognized that the methodology previously described herein with respect to FIGS. 1–8 is recursive in nature. Specifically, as illustrated in the following exemplary source code (and Appendix I hereto), a recursive call to the iterator "each_output" on the subset ranges is utilized to identify useful differences and similarities among the various subsets of data:

```
// Exclude some because they are totally unique. Run the
// algorithm on the subset, and at the end, print the unique
ones.
// Fashion arguments that represent the subset of items.
Input_infos subset_ranges;
for (int i=0; i<input_count; i++)
   if (!exclude_set.contains(i)) subset_ranges.add(infos[i]);
   if (subset_ranges.count(   ))  each_output(yield,subset_ranges);
^^^^^^^^^^
for (int i=0; i<input_count; i++)
   if (exclude_set.contains(i))
   print_separately(yield,i,infos[i]);
. . .
```

Furthermore, it will be recognized that due to the recursive nature of the invention, the terms "all inputs" and "all strings" generally refer only to those inputs or strings under analysis or consideration during a given recursion.

Appendix I hereto provides exemplary code for the functionality illustrated in FIGS. 1–8 herein, implemented in a dialect of C++which includes iterators. As is well known, iterators are C++intrinsic operators implemented in many C++compilation systems such as the High C/C++compilation system of the Assignee hereof. However, the foregoing methods may be readily reduced to source code listings in any other useful higher level programming language, and subsequently compiled, by one of ordinary skill in the computer programming arts.

Example of Method

The following example illustrates the foregoing methodology in detail, in the context of the four data inputs of Table 1 above.

1. First, each input is examined and any strings which occur only once in that input are identified. These strings are designated as 'unique'.
2. Next, the unique strings in each input are compared to determine which ones are also unique in all other inputs. If any input does not share any unique strings with any other input, that input is set aside to be displayed separately and repeat the test with the remaining inputs. If there are no shared unique strings, Step 7 below is next performed.
3. For the data of Table 1, Input 4 would be set aside, leaving the following:

TABLE 2

| Input 1 | Input 2 | Input 3 |
|---------|---------|---------|
| A | A | A |
| R | C | C |
| B | B | B |
| C | C |  |
| D | D | D |
| B | B | B |

Note that strings A and D were identified as "unique."

4. Next, the inputs are split into a series of matching and non-matching chunks; where the matching chunks contain the shared unique strings; and the non-matching chunks contain the rest of the input. In the case of the data provided in Table 1:

TABLE 3

|  | Input 1 | Input 2 | Input 3 |
|---|---------|---------|---------|
| Match | A | A | A |
| Non-match | R | C | C |
|  | B | B | B |
|  | C | C |  |
| Match | D | D | D |
| Non-match | B | B | B |

4. Next, the inputs are examined to ensure that the matching chunks occur in the same order in every input. If they do not, a string-by-string comparison (discussed below) is performed.
5. Next, the matching chunks are "grown" by absorbing surrounding strings which are identical in all inputs. Such strings are also removed from the non-matching chunks.
   a. Each matching chunk is grown backwards by comparing the string at the end of the immediately preceding non-matching chunk in each input. If that string is identical in all inputs, it is removed from each input's non-matching chunk and prepended to the matching chunk. If the preceding non-matching chunk is completely emptied (in all inputs), it is deleted, and the now adjacent preceding matching chunk is merged into this chunk and the foregoing step repeated with the new merged chunk. The process is ceased when the beginning of any input is reached, or when the preceding string is not identical in every input.
   b. Similarly each matching chunk is grown forward by comparing and appending the first string of the immediately following non-matching chunk until the end of an input is reached or the following string is not identical in all inputs. In the preceding example of Table 1:

TABLE 4

|  | Input 1 | Input 2 | Input 3 |
|---|---------|---------|---------|
| Match |  | A |  |
| Non-match | R | C | C |
|  | B | B | B |
|  | C | C |  |
| Match |  | D |  |
|  |  | B |  |

6. Next, the chunks are stepped through in order as they appear in the inputs. If a chunk is a matching chunk, its contents are displayed, along with an indication of which input streams contained it. If it is a non-matching chunk, the foregoing method is applied recursively from Step 1, taking the contents of each input's non-matching chunk as the entire contents of that input.

In the example of Table 1:
Display: [1–3] A and recur, with the new inputs being:

TABLE 5

| Input 1 | Input 2 | Input 3 |
|---------|---------|---------|
| R | C | C |
| B | B | B |
| C | C |  |

Display: [1–3]D
Display: [1–3]B

7. The inputs which were set aside in step 2 are now stepped through successively, the contents of each being displayed along with an identification of which input is being displayed. In the Table 1 example:
Display: [4]S
Display: [4]T
Display: [4]U
Display: [4]V String-by-String Comparison
1. Each input is scanned, counting the percentage of strings that also occur in at least one other input. If that percentage exceeds a pre-set threshold, that input is set aside to be printed separately.
2. The first string of the first input is compared with the first string of each of the other inputs, separating the inputs into those for which the first string matches, and those which don't.
3. The identities of the matching inputs, and the string, are displayed.
4. Steps 2 and 3 are next repeated for the inputs which did not match.
5. Steps 2 through 4 are then repeated for each string until all of the inputs are exhausted.
6. Next, the inputs which were set aside in step 1 are stepped through successively. For each input, its strings are stepped through individually and sequentially, printing the input identification and the string.

It will be recognized that while the foregoing example and description with respect to FIGS. 1–8 herein are cast in terms of a specific series of steps for accomplishing the desired result (i.e., analysis and formatting of the input data), various permutations of this series of steps, including substitution and/or addition of other steps, may be used consistent with the invention disclosed herein. For example, it was previously noted that the use of a symbol table may in certain circumstances enhance the performance of the method as a whole. However, such symbol table is not essential to the practice of the invention.

Accordingly, the scope of the disclosed invention should be determined by the claims appended hereto, without respect to specific embodiments or limitations presented within the foregoing discussion.

Applications

There are many applications where it is useful or even necessary to determine the differences among multiple output streams. Quickly locating the areas of difference and readily identifying which streams differ and which agree at each point of difference can greatly speed the development and debugging processes. In some cases, the goal is to modify the process or device which generates the output being analyzed; the analysis verifies that the output remains within the expected and desired parameters. In other cases, the modifications are expected to change the outputs in ways that indicate some improvement in the generating mechanism.

As an example of the foregoing, the present invention may be applied to compare outputs of multiple design simulations having varying parameters in order to assess the relative merits of each design.

Another application of the invention is for debugging multi-processor hardware. Specifically, in one aspect, the same task can be executed on each processor with the outputs compared by this method. Potential hardware and software integration problems may be discovered and located by examining any areas of difference among the outputs. Similarly, when debugging simulated processor functions in a multi-processor environment, the method of the present invention may be used to compare the outputs of each of the simultaneous processes. Any differences readily identify which processes differ and in what areas of the output.

When testing a processor or ASIC design and comparing outputs from multiple simulation types (gate, switch, logic, etc.), the present invention may be used to identify differences among the outputs that are indicative of areas of the design which may require refinement or verification.

As yet another application, the present invention may be used to compare multiple instances of a netlist for different optimizations of a hardware design (e.g., through a synthesizer).

It is also noted that certain high-reliability systems (e.g., early design of the primary on-board computer systems in the space shuttle) rely upon concurrent computation with a comparison of the results and some sort of "voting" scheme to automatically determine when a processor may be producing unreliable results. Such high-reliability systems were used, for example, in the early design of the primary on-board computer systems in the space shuttle. These systems often use different algorithms in some of the concurrent processes so that any flaw in the basic algorithm is likely to be caught during the voting stage. During the development and debugging of such systems, the methodology of the present invention advantageously provides a mechanism for readily highlighting any differences in the outputs among the various of such concurrent processes. Hence, real-time analysis of the outputs of such systems may be accomplished.

As yet another application of the invention, divergent modifications to a single source code base may be compared. Specifically, the methodology of the invention will facilitate identification of the areas where each modified source differs from the original base (and from the other modifications), as well as the areas where the modifications affected the same portions of code. This functionality is useful for either choosing between the various modification sets, or re-integrating them into a single merged source base.

It will also be recognized that the methodology of the present invention may be used when migrating a given program from one processor to another. For example, a programmer or designer desiring to "move" an application from one core to another can use the debugger disclosed herein to debug the same program on both processors at the same time. Furthermore, the debugger may be used to display data at different points in each program which should be identical to that in the other program. This identical relationship (or lack thereof) can be automatically confirmed using the methodology of the present invention.

Apparatus for Implementing Methodology

Referring now to FIG. 9, one embodiment of a computing device capable of implementing the data input analysis and formatting methods discussed previously herein with respect to FIGS. 1–9 is described. The computing device 900 comprises a motherboard 901 having a central processing unit (CPU) 902, random access memory (RAM) 904, and memory controller 905. A storage device 906 (such as a hard disk drive or CD-ROM), input device 907 (such as a keyboard or mouse), and display device 908 (such as a CRT, plasma, or TFT display), as well as buses necessary to support the operation of the host and peripheral components, are also provided. The method of FIGS. 1–9 are embodied in the form of an object code representation of a computer program and stored in the RAM 904 and/or storage device 906 for use by the CPU 902 during analysis, the latter being well known in the computing arts. Alternatively, the computer program may reside on a removable storage device (not shown) such as a floppy disk or magnetic data cartridge of the type also well known in the art. The user (not shown) analyzes the data input from the various data sources by inputting initiating operation of the computer program via the program displays and the input device 907 during system operation. Alternatively, the system may be configured to automatically accept (and store if desired) the various data inputs and run the computer program when sufficient data exist, or on a periodic or ongoing basis. Many such alternative are possible, each being well within the skill of the ordinary practitioner. Analyses and/or formatted data generated by the program are stored in the storage device 906 for later retrieval, displayed on the graphic display device 908 for viewing by the user, or output to an external device such as a printer, data storage unit, other peripheral component via a serial or parallel port 912 if desired.

Figure 9:
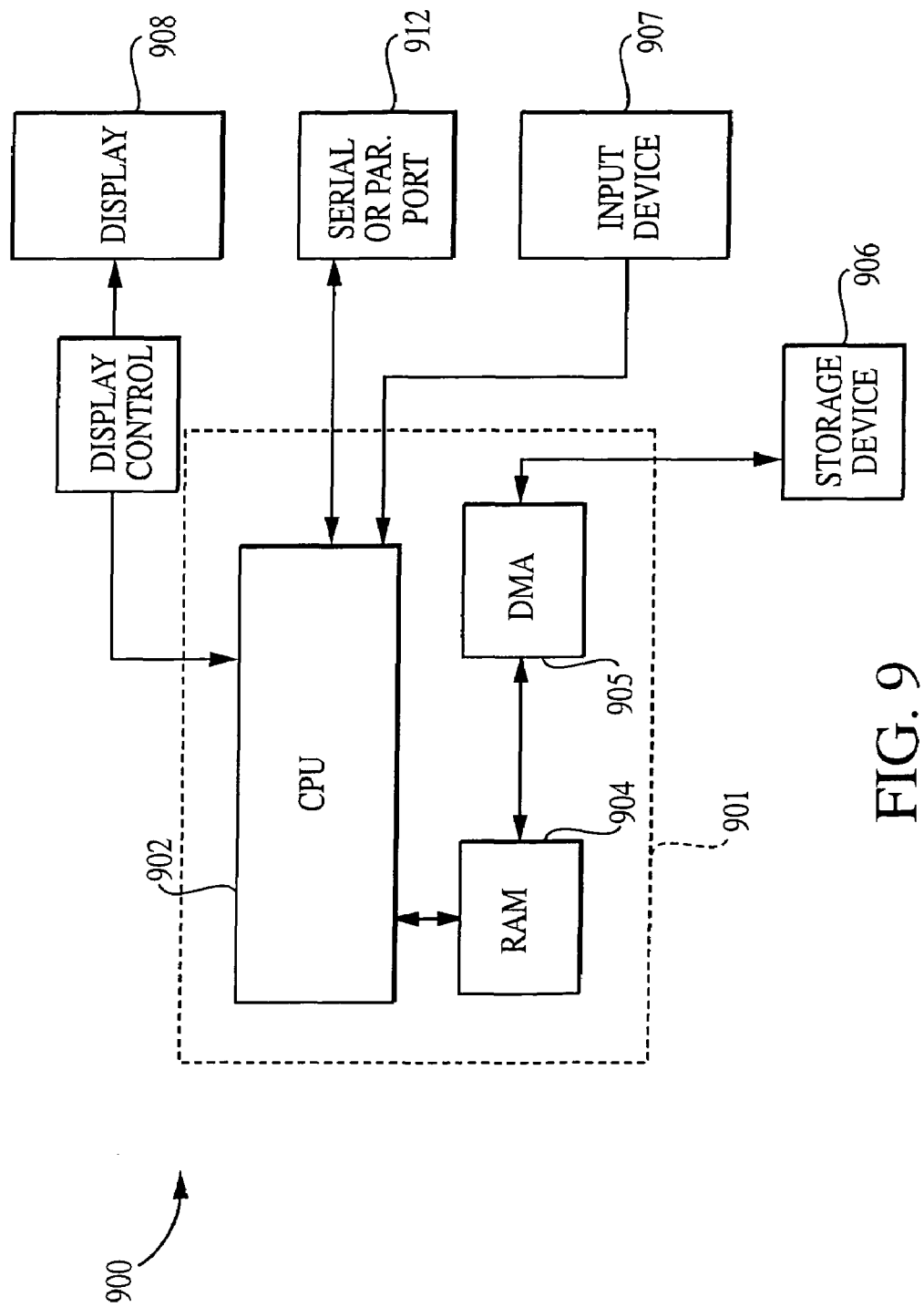
FIG. 9 is a functional block diagram of one exemplary embodiment of a computer system useful for running a computer program embodying the method of FIGS. 1–8.
Figure 10:
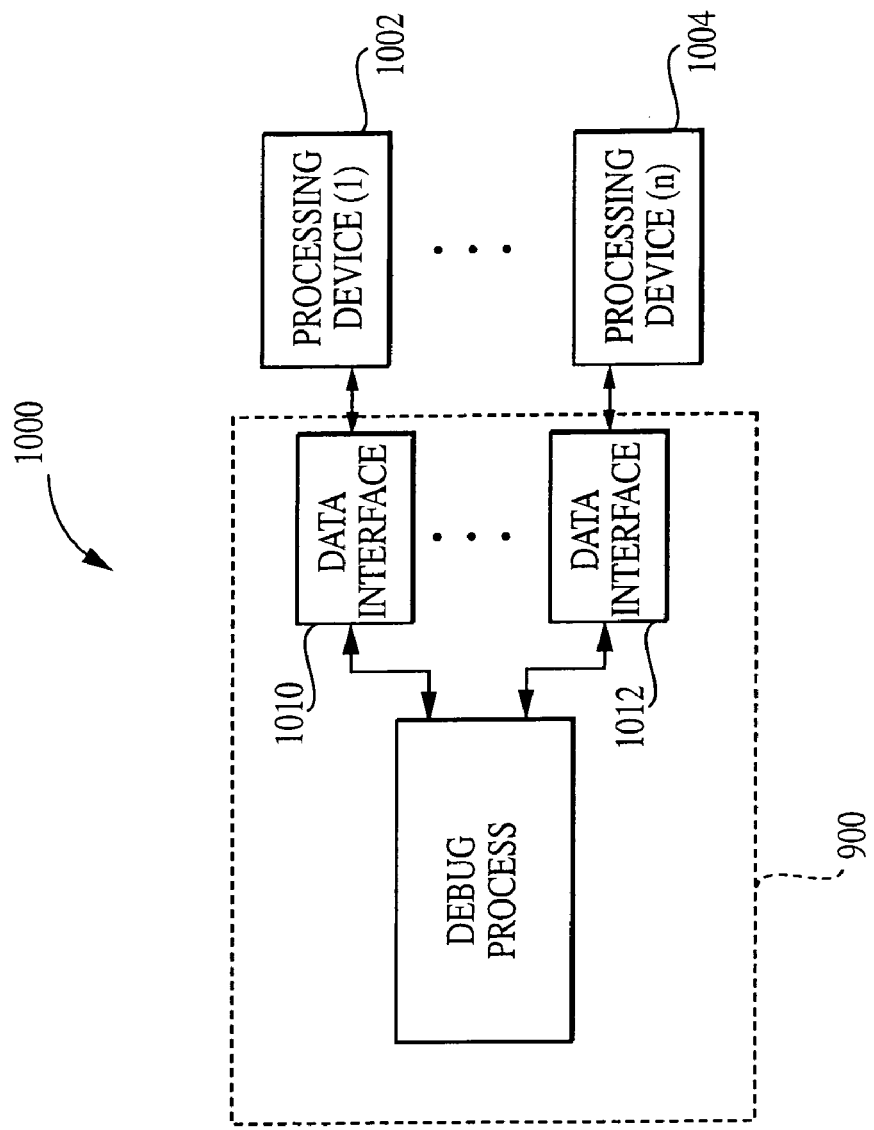
FIG. 10 is a functional block diagram of the computer system of FIG. 9, including data interfaces to a plurality of processors being debugged.

FIG. 10 illustrates one embodiment of the apparatus of FIG. 9 in data communication with two processor devices (e.g., two RISC cores, one RISC core and one DSP function, one RISC core and one ASIC macro-function, etc.). It will be recognized that while two processing devices 1002, 1004 are illustrated in the system 1000 of FIG. 10, the present invention may be utilized in conjunction with any number (N) of different software processes or data sources disposed on any number of separate devices. The system 1000 further includes two data interfaces 1010, 1012 adapted for two-way data communication between the apparatus 900 and the respective data processors 1002, 1004.

Computer Program

A computer program for implementing the aforementioned methods of data analysis is now described. In one exemplary embodiment, the computer program comprises an object ("machine") code representation of a C++source code listing implementing the methodology of FIGS. 1–8 herein. While C++language is selected for the present embodiment, it will be appreciated that other programming languages may be used, including for example VisualBasic™, Fortran, and C+. The object code representation of the source code listing is compiled and disposed on a media storage device of the type well known in the computer arts. Such media storage devices can include, without limitation, optical discs, CD ROMs, magnetic floppy disks or "hard" drives, tape drives, or even magnetic bubble memory. The computer program further comprises a graphical user interface (GUI) of the type well known in the programming arts, which is operatively coupled to the display and input device of the host computer or apparatus on which the program is run (described above with respect to FIG. 9).

In a second embodiment, the computer program of the invention comprises an assembly language/micro-coded instruction set disposed within the embedded storage device, i.e. program memory, of a digital signal processor (DSP) or microprocessor. While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

I claim:

1. A method of analyzing a plurality of input strings of data derived from respective ones of a plurality of data processors, said plurality of input strings of data being generated by a same task, comprising:
   initializing the data in each of said strings;
   finding the differences between said strings;
   providing said differences in a display to a user;
   wherein said act of finding the differences comprises:
      identifying groups of said data within said strings that are identical across said plurality of input strings; and
      identifying groups of said data within said strings that appear in the same order within all of said strings; and
   analyzing said groups of said data for potential hardware or software integration problems associated with one or more of said data processors based at least in part on said differences between said plurality of strings.

2. The method of claim 1, wherein the act of initializing comprises:
   creating a symbol table having a plurality of symbol numbers associated therewith;
   creating said symbol array having at least one element for each of said strings;
   for each of said input strings, determining whether said each string is present in said symbol table; and
   if said each string is present in said symbol table, obtaining at least one symbol number for said string from said symbol table.

3. The method of claim 1, wherein said strings each comprise a plurality of lines, and said method further comprises:
   forming a plurality of groups of lines, wherein a group comprises a sequence of lines that are the same in all of said strings; and
   recursively analyzing, in order:
      a first region of all the strings that appears before the first of said plurality groups;
      each of a plurality of second regions occurring between two of said plurality of groups; and
      a third region following the last of said plurality of groups.

4. A method of analyzing a plurality of strings of data derived from at least one data processing device, said plurality of strings of data being generated by a plurality of processors within said at least one data processing device operating on a same task, comprising:
   initializing said data, said act of initializing including creating a symbol array;
   analyzing said strings of data based at least in part on said symbol array; and
   identifying at least one relationship between one or more of said data within one or more of said strings;
   wherein said act of identifying comprises:
      identifying groups of said data within said strings that are identical across said plurality of input strings; and
      identifying groups of said data within said strings that appear in the same order within all of said strings; and
   analyzing said groups of said data for potential hardware or software integration problems associated with one or more of said plurality of processors based at least in part on said relationship between said plurality of strings.

5. The method of claim 4, wherein the act of initializing comprises:
   creating a symbol table having a plurality of symbol numbers associated therewith;
   creating said symbol array having at least one element for each of said strings;
   for each of said input strings, determining whether said each string is present in said symbol table; and
   if said each string is present in said symbol table, obtaining at least one symbol number for said string from said symbol table.

6. A storage device, comprising:
   a computer readable medium;
   a computer program stored on said computer readable medium, said program being adapted for analyzing a plurality of strings of data derived from at least one data processing device having a plurality of processor cores, said cores operating on a same task according to the method comprising:
      initializing said data, said act of initializing including creating a symbol array;
      analyzing said strings of data based at least in part on said symbol array;
      identifying at least one relationship between one or more of said data within one or more of said strings;
      wherein said act of identifying comprises:
         identifying groups of said data within said strings that are identical across said plurality of input strings; and
         identifying groups of said data within said strings that appear in the same order within all of said strings; and
      analyzing said groups of said data for potential hardware or software integration problems associated with one or more of said plurality of processor cores based at least in part on said relationship between said plurality of strings generated by said same task.

7. The storage device of claim 6, wherein said strings each comprise a plurality of lines, and said method further comprises:
   forming a plurality of groups of lines, wherein a group comprises a sequence of lines that are the same in all of said strings; and
   recursively analyzing, in order: a first region of all the strings that appears before the first of said plurality groups;
   each of a plurality of second regions occurring between two of said plurality of groups; and
   a third region following the last of said plurality of groups.

8. A data processing device, comprising:
   a processor adapted to process digital data and execute a computer program;
   a storage device in data communication with said processor, said storage device comprising:
      a computer readable medium;
      a computer program stored on said computer readable medium, said program being adapted for analyzing a plurality of strings of data derived from at least one data processing device having a plurality of processor cores, each of said processor cores running a same task according to the method comprising:
         initializing said data, said act of initializing including creating a symbol array;
         analyzing said strings of data based at least in part on said symbol array; and
         identifying at least one relationship between one or more of said data within one or more of said strings;
         wherein said act of identifying comprises:
            identifying groups of said data within said strings that are identical across said plurality of input strings; and
            identifying groups of said data within said strings that appear in the same order within all of said strings; and
            analyzing said groups of said data for potential hardware or software integration problems associated with one or more of said plurality of processor cores based at least in part on said relationship between said plurality of strings generated by said same task.

9. The device of claim 8, further comprising a plurality of data interfaces adapted to receive said data strings from respective ones of a plurality of software processes running on respective ones of said plurality of processor cores.

10. A multi-processor integrated circuit device, comprising:
    a first processor core adapted to run a first software process, said first software process adapted to generate a first string of data;
    a second processor core adapted to run a second software process said second software process adapted to generate a second string of data;
    wherein said first and second software processes are a same task;
    at least one data interface, wherein said first and second processors respectively transfer data comprising said first and second strings to an external debug process adapted to identify similarities and differences between the operation of said first and second software processes on said first and second processors, via said at least one interface;
    wherein said debug process identifies the similarities and differences by:
       identifying groups of said data within said first and second strings that are identical across at least both of said strings; and
       identifying groups of said data within said first and second strings that appear in the same order within at least both of said strings; and
    wherein said debug process is adapted to analyze said groups of said data for potential hardware or software integration problems associated with either of said processor cores based at least in part on said similarities and differences between said plurality of strings generated by said first and second software processes.

11. The integrated circuit device of claim 10, wherein said strings each comprise a plurality of lines, and said debug process is further adapted to:
    form a plurality of groups of lines, wherein a group comprises a sequence of lines that are the same in all of said strings; and
    recursively evaluate, in order:
       a first region of all the strings that appears before the first of said plurality groups;
       each of a plurality of second regions occurring between two of said plurality of groups; and
       a third region following the last of said plurality of groups.

12. A method of analyzing a plurality of inputs of data derived from respective ones of a plurality of data processors, comprising:
    initializing the data in each of said inputs;
    generating said plurality of inputs of data by running a same task on respective ones of said plurality of data processors;
    identifying at least one relationship between one or more of said data within one or more of said inputs, said act of identifying comprising:
       creating a list of anchors containing strings that occur exactly once in every one of said inputs;
       marking at least one of said strings as belonging to a group; and
       determining whether a string occurring before said group is identical in each of said inputs; and
    analyzing said at least one relationship among said plurality of inputs of data, said act of analyzing comprising finding areas of the design which may require refinement or verification.

13. The method of claim 12, further comprising examining a string immediately after said group to determine if it is identical in each of said inputs.

14. A method of analyzing a plurality of input strings of data derived from respective ones of a plurality of data processors, said plurality of input strings of data being generated by a same task, comprising:
    varying at least one parameter on at least one of said plurality of data processors;
    initialize the data in each of said strings;
    find the differences between said strings generated by said same task;
    provide said differences in a display to a user;
    wherein said act of finding the differences comprises:
       identifying groups of said data within said strings that are identical across said plurality of input strings; and identifying groups of said data within said strings that appear in the same order within all of said strings; and analyzing said groups of said data to verify that said act of varying at least one parameter on at least one of said plurality of data processors remains within a desired parameter.

15. The method of claim 14, wherein said plurality of data processors are RISC cores.

16. The method of claim 14, wherein at least one of said plurality of data processors is a RISC core and at least one of said plurality of data processors is a digital signal processor.

17. The method of claim 14, wherein at least one of said plurality of data processors is a RISC core and at least one of said plurality of data processors is an ASIC macrofunction.

18. A computer system for simulating the operation of a multi-processor integrated circuit device, comprising: a processor a first simulated processor core adapted to run a first software process, said first software process adapted to generate a first string of data a memory;

a second simulated processor core adapted to run a second software process said second software process adapted to generate a second string of data;

wherein said first and second software processes are the same;

a debug process adapted to identify similarities and differences between the operation of said first and second software processes on said first and second simulated processors, via at least one interface;

wherein said debug process identifies the similarities and differences by:

identifying groups of said data within said first and second strings that are identical across at least both of said strings; and identifying groups of said data within said first and second strings that appear in the same order within at least both of said strings.

19. A computer system of claim 18, wherein said strings each comprise a plurality of lines, and said simulation further comprises:

forming a plurality of groups of lines, wherein a group comprises a sequence of lines that are the same in all of said strings; and recursively analyzing, in order:

a first region of all the strings that appears before the first of said plurality of groups;

each of a plurality of second regions occurring between two of said plurality of groups; and a third region following the last of said plurality of groups.

20. A method for migrating a program from a first processor to a second processor, comprising:

disposing said program on said first processor;

disposing said program on said second processor;

debugging said program on both said first and second processors simultaneously, said act of debugging, comprising:

generating a plurality of strings of data derived from respective ones of said processors;

finding the differences between said strings; and providing said differences in a display to a user;

wherein said act of finding the differences comprises:

identifying groups of said data within said strings that are identical across said plurality of input strings; and identifying groups of said data within said strings that appear in the same order within all of said strings; and analyzing said groups of said data for potential hardware or software integration problems associated with said program migration from said first processor to said second processor based at least in part on said differences between said plurality of strings.

21. A method of analyzing a plurality of input strings of data derived from respective ones of a plurality of data processors, said plurality of input strings of data being generated by a same task, comprising:

varying at least one parameter on at least one of said plurality of data processors;

initialize the data in each of said strings;

find the differences between said strings; and provide said differences in a display to a user;

wherein said act of finding the differences comprises:

identifying groups of said data within said strings that are identical across said plurality of input strings; and identifying groups of said data within said strings that appear in the same order within all of said strings; and analyzing said groups of said data to verify that said act of varying at least one parameter on at least one of said plurality of data indicates some improvement in said act of generating.

22. An integrated circuit device, comprising:

a first processing means for running a first software process, said first software process adapted to generate a first string of data;

a second processing means adapted to run a second software process said second software process adapted to generate a second string of data;

wherein said first and second software processes are a same task;

at least one data interface means, wherein said first and second processing means respectively transfer data comprising said first and second strings to an external debug process adapted to identify similarities and differences between the operation of said first and second software processes on said first and second processing means, via said at least one interface means;

wherein said debug process identifies the similarities and differences by:

identifying groups of said data within said first and second strings that are identical across at least both of said strings; and identifying groups of said data within said first and second strings that appear in the same order within at least both of said strings; and wherein said debug process is adapted to analyze said groups of said data for potential hardware or software integration problems associated with either of said processor cores based at least in part on said similarities and differences between said plurality of strings generated by said first and second software processes.

23. The integrated circuit device of claim 22, wherein said strings each comprise a plurality of lines, and said debug process is further adapted to:

form a plurality of groups of lines, wherein a group comprises a sequence of lines that are the same in all of said strings; and recursively evaluate, in order:
- a first region of all the strings that appears before the first of said plurality groups;
- each of a plurality of second regions occurring between two of said plurality of groups; and
- a third region following the last of said plurality of groups.

24. A computer system for simulating the operation of an integrated circuit device, comprising a processor:
- a first simulated processing means for running a first software process, said first software process adapted to generate a first string of data a memory;
- a second simulated processing means for running a second software process said second software process adapted to generate a second string of data;
- wherein said first and second software processes are the same;
- a debug processing means for identifying similarities and differences between the operation of said first and second software processes on said first and second simulated processing means, via at least one interface;
- wherein said debug processing means identifies the similarities and differences by:
  - identifying groups of said data within said first and second strings that are identical across at least both of said strings; and
- wherein said debug processing means is adapted to identify groups of said data within said first and second strings that appear in the same order within at least both of said strings.

25. A computer system of claim 24, wherein said strings each comprise a plurality of lines, and said simulation further comprises:
- forming a plurality of groups of lines, wherein a group comprises a sequence of lines that are the same in all of said strings; and
- recursively analyzing, in order:
  - a first region of all the strings that appears before the first of said plurality groups;
  - each of a plurality of second regions occurring between two of said plurality of groups; and
  - a third region following the last of said plurality of groups.

* * * * *